Jan. 29, 1924.
D. E. JEWITT
1,481,843
ELECTRIC POWER SYSTEM
Filed June 1, 1921
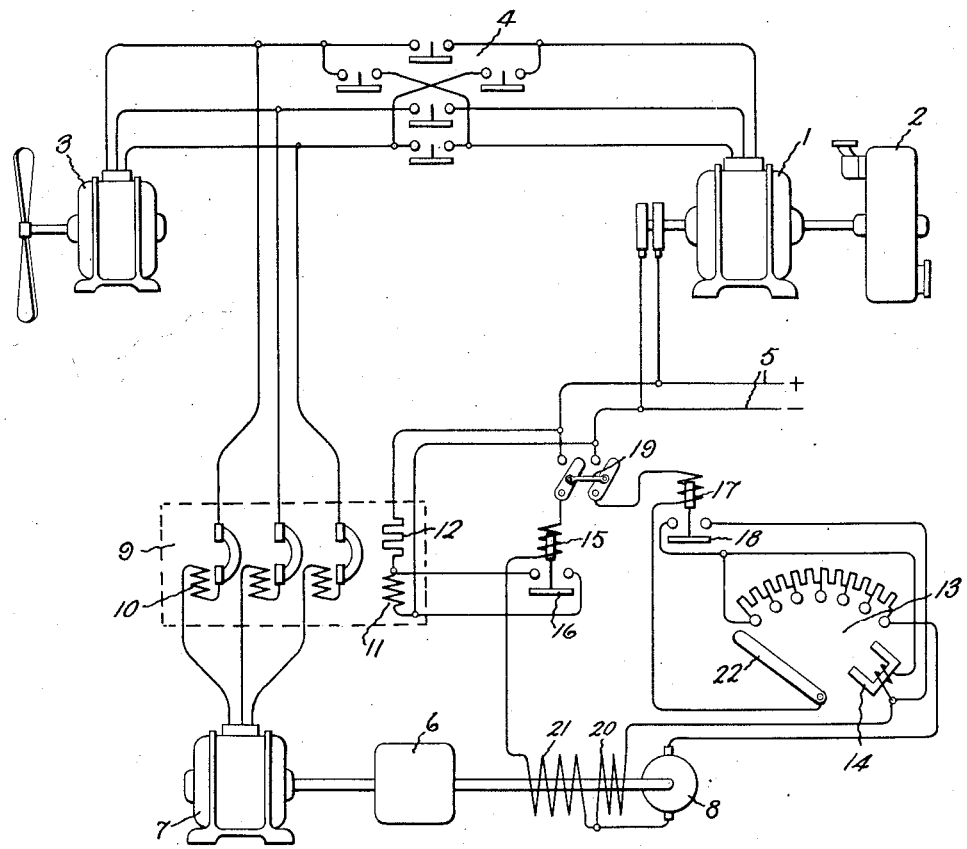
Inventor:
Dennis E. Jewitt,
by Albert G. Davis
His Attorney.

Patented Jan. 29, 1924.

1,481,843

UNITED STATES PATENT OFFICE.

DENNIS E. JEWITT, OF RUGBY, ENGLAND, ASSIGNOR TO GENERAL ELECTRIC COMPANY, A CORPORATION OF NEW YORK.

ELECTRIC-POWER SYSTEM.

Application filed June 1, 1921. Serial No. 474,121.

*To all whom it may concern:*

Be it known that I, DENNIS ERNEST JEWITT, a subject of the King of Great Britain, residing at Rugby, in the county of Warwickshire, England, have invented certain new and useful Improvements in Electric-Power Systems, of which the following is a specification.

My invention relates to electric power systems and particularly to systems of electric ship propulsion in which the propeller or propellers are driven by alternating current induction motors or synchronous motors, and in which the speed variations are obtained by varying the frequency and voltage of the generators supplying current to the motors. In such systems it is desirable to utilize the current from the main source of alternating current to drive some of the auxiliary machines, for example, the boiler room fan. When an auxiliary fan is driven by current from such a source, it is an advantage, as the variations in the frequency will automatically vary the supply of air, for combustion and other purposes, in accordance with the speed of the propeller; but it is essential that there should be a minimum speed fixed for the fan and it is also essential to maintain the fan running even though the current supplied from the main turbines and generators is stopped temporarily for maneuvering or other purposes.

My invention will be better understood from the following description taken in connection with the accompanying drawing, and its scope will be pointed out in the appended claims.

The accompanying drawing illustrates diagrammatically a ship propulsion system embodying my invention.

Referring to the drawing, 1 represents an alternating current generator driven by the adjustable speed prime mover 2, diagrammatically indicated as a turbine, for supplying current to the alternating current propeller driving motor 3. Suitable circuit controlling and reversing switches 4 may be provided for maneuvering the ship in a manner well known in the art. A source of direct current 5 is provided to supply the excitation circuit of the generator 1 and to furnish direct current for other purposes. An auxiliary machine 6, which may, for example, be the boiler room fan, is arranged to be driven by an induction motor 7 suitable for the maximum duty of the fan. A direct current motor 8 is also arranged to drive the fan 6 at the minimum required speed. To connect the induction motor 7 to the main source of supply, I provide a circuit breaker 9 provided with overload trip coils 10 and a no-voltage release coil 11 energized from the direct current source 5 through a resistor 12 provided for the purpose of enabling the coil 11 to be short circuited without short circuiting the direct current source. The circuit breaker 9 may be of any well known type but will preferably be of the free handle type. The direct current motor 8 is shown provided with a motor starter 13 having any ordinary form of no-voltage release coil 14 and this motor is connected to be supplied from the direct current source 5. An overload relay 15 is provided in the circuit of the motor 8 and this relay is provided with a contact 16 arranged to short circuit the coil 11 upon a predetermined current in the circuit of the motor 8. A second overload relay 17 is also provided in the circuit of the motor 8 provided with a contact 18 arranged to short circuit the no-voltage release coil 14 upon the occurrence of a predetermined overload current in the circuit of the motor 8. Relay 17 will be set to operate at a higher value of current than the relay 15. Any suitable switching means may be provided for controlling the circuit of the motor 8 and such switching means is indicated at 19.

The motor 8 is represented as having a shunt winding 20 and a series winding 21. This motor is designed to have a speed load characteristic which will give the fan the minimum speed required when it is carrying the corresponding horse power load. When relieved of this load, the characteristic of the motor will allow the speed to rise and when on light load the direct current motor speed should not be less than the maximum speed of the fan when driven by the alternating current motor 7. This allows of both motors being connected to their respective supplies at the same time.

The alternating current motor 7 will control the speed of the fan down to the minimum speed, and if the alternating current supply fails due, for example, to manipulation of the circuit controlling switches 4, the direct current motor will keep the fan running at this speed. If the alternating current supply does not fail entirely but its frequency falls so low as to cause the alternating current motor to run at a speed below the minimum fan speed, the direct current motor will tend to drive the alternating current motor as an induction generator. This will throw an additional load upon the direct current motor and will cause the operation of the overload relay 15 which will operate its contacts 16 to short circuit the coil 11 and open the circuit breaker 9, disconnecting the alternating current motor from its supply circuit. If at any time during the normal operation of the system, the motor 7 becomes overloaded, the overload trip coils 10 will cause the circuit breaker to interrupt the circuit of this motor. The fan 6 will continue to be driven by the direct current motor 8 at its minimum speed, but if this motor also becomes overloaded, the relay 17 will operate its contact 18 to deenergize the holding coil 14 of the starting rheostat permitting the rheostat arm 22 to move to its off position in a manner well known in the art.

It will be obvious that various changes from the arrangement illustrated and described may be made to suit different conditions of operation without departing from the scope of my invention. It is obvious that the particular form of switch gear used will depend upon the particular type of motor selected, but, in any case, the switch gear should be interlocked with the direct current motor controlling means to render the switch gear automatic in operation. It is also apparent that other auxiliary machines, either together with or instead of the boiler room fan, may be driven by an auxiliary motor as herein described.

What I claim as new and desire to secure by Letters Patent of the United States, is,—

1. In a system of electric ship propulsion of the type wherein a propeller is driven by an alternating current motor and wherein speed variations are obtained by varying the frequency and voltage of the current supplied to the motors, and wherein some of the auxiliary machines are normally driven by alternating current motors supplied from said source of variable frequency, the combination with one of said alternating current motors of an auxiliary direct current motor for driving the auxiliary machine at a minimum speed, an automatic switching mechanism adapted to disconnect the alternating current motor from the supply when the speed of the machine drops below the predetermined minimum.

2. In a system of electric ship propulsion of the type wherein a propeller is driven by an alternating current motor, and wherein speed variations are obtained by varying the frequency and voltage of the current supplied to said motor, and wherein an auxiliary machine is normally driven by an alternating current motor supplied from the source of variable frequency, the combination with said alternating current motor of an auxiliary direct current motor for driving the auxiliary machine at a minimum speed, a circuit breaker in the circuit of said auxiliary alternating current motor, starting means for the direct current motor, and means responsive to the load on the direct current motor for opening said circuit breaker when the speed of the alternating current motor falls below the predetermined minimum.

3. An electric power system comprising a main load driving motor, a source of current of variable frequency and voltage for supplying said main motor to operate the same at variable speeds, an auxiliary machine, a pair of auxiliary motors adapted to be connected to drive said auxiliary machine, connections for normally supplying one of said auxiliary motors from said variable frequency source, connections for supplying the other auxiliary motor from an independent source, and means for disconnecting the auxiliary motor from the variable frequency source in case the frequency reaches an abnormal value.

4. An electric power system comprising a main load driving motor, a source of current of variable frequency and voltage for supplying said main motor to operate the same at variable speeds, an auxiliary machine, an alternating current motor and a direct current motor arranged to drive said auxiliary machine, connections for supplying said alternating current motor from said variable frequency source, and means responsive to the load on the direct current motor for controlling the operation of the alternating current motor.

5. An electric power system comprising a main load driving motor, a source of current of variable frequency and voltage for supplying said main motor to operate the same at variable speeds, an auxiliary machine, an alternating current motor and a direct current motor arranged to drive said auxiliary machine, connections for normally supplying said alternating current motor from said variable frequency source, said direct current motor having a speed load characteristic such that it will carry the full load of the auxiliary machine at the required minimum speed thereof and such that the no-load speed will not be less than the maximum speed of the machine when driven by the alternating current motor, and means for disconnecting said alternating current motor from its source of supply when the frequency falls to such a low value that the alternating current motor tends to operate as a generator driven by the direct current motor.

6. An electric power system comprising a main load driving motor, a source of current of variable frequency and voltage for supplying said motor to operate the same at variable speeds, an auxiliary machine, an alternating current motor and a direct current motor arranged to drive said auxiliary machine, connections for normally supplying said alternating current motor from said variable frequency source, and means for disconnecting the alternating current motor from its source of supply upon the occurrence of a predetermined load upon the direct current motor and for also disconnecting the direct current motor from its source of supply upon the occurrence of a predetermined overload.

7. In an electric power system, a machine adapted to run at variable speeds but requiring a predetermined minimum speed, an alternating current motor arranged to drive said machine, a source of current of variable frequency and voltage for normally supplying said motor, a direct current motor also arranged to drive said machine, said direct current motor having a speed load characteristic such that it will carry the full load of the machine at the required minimum speed thereof and such that the no-load speed will not be less than the maximum speed of the machine when driven by the alternating current motor, and means responsive to the load on the direct current motor for controlling the connection between the alternating current motor and its source of supply.

8. In an electric power system, a machine adapted to run at variable speeds but requiring a predetermined minimum speed, an alternating current motor, and a direct current motor each arranged to drive such machine, a variable source of alternating current supply for said alternating current motor and means responsive to the load on the direct current motor for controlling the operation of the alternating current motor.

9. In an electric power system, a machine adapted to run at variable speeds, a plurality of motors each adapted to drive said machine, independent sources of supply for said motors, one of which is variable in character, and means responsive to the load on one of said motors for controlling the operation of another of the motors.

In witness whereof, I have hereunto set my hand this ninth day of May, 1921.

DENNIS E. JEWITT.

Witnesses:
J. A. FOSTER,
D. WHITE.